United States Patent [19]

Hou et al.

[11] Patent Number: 4,724,207

[45] Date of Patent: Feb. 9, 1988

[54] MODIFIED SILICEOUS CHROMATOGRAPHIC SUPPORTS

[75] Inventors: Kenneth C. Hou, S. Glastonbury; Tung-Ping D. Liao, Vernon, both of Conn.

[73] Assignee: Cuno Incorporated, Meriden, Conn.

[21] Appl. No.: 643,613

[22] Filed: Aug. 22, 1984

Related U.S. Application Data

[63] Continuation-in-part of Ser. No. 576,448, Feb. 2, 1984, Pat. No. 4,663,163, which is a continuation-in-part of Ser. No. 466,114, Feb. 14, 1983, abandoned.

[51] Int. Cl.$^4$ .............................................. C12N 11/08
[52] U.S. Cl. .................................... 435/180; 435/177; 435/181; 525/320; 525/326.7; 525/327.3; 525/342; 424/85; 424/88; 210/656; 210/660; 210/692
[58] Field of Search ..................... 435/177, 180, 181; 524/451; 525/342, 320 R, 326.7, 327.3; 424/85, 88; 210/656, 660, 692

[56] References Cited

U.S. PATENT DOCUMENTS

| | | |
|---|---|---|
| 3,158,532 | 11/1964 | Pall et al. . |
| 3,246,767 | 4/1966 | Pall et al. . |
| 3,251,475 | 5/1966 | Till et al. . |
| 3,353,682 | 11/1967 | Pall et al. . |
| 3,488,922 | 1/1970 | Kirkland et al. . |
| 3,573,158 | 3/1971 | Pall et al. . |
| 3,577,266 | 5/1971 | Kirkland . |
| 3,583,855 | 6/1971 | Bolinger et al. . |
| 3,651,210 | 3/1972 | Shepler et al. . |
| 3,772,181 | 3/1973 | Kirkland et al. . |
| 3,795,313 | 3/1974 | Kirkland et al. . |
| 3,808,125 | 4/1974 | Good . |
| 3,878,092 | 4/1975 | Fuller . |
| 3,983,299 | 9/1976 | Regnier . |
| 3,984,349 | 10/1976 | Meiller et al. . |
| 4,029,583 | 6/1977 | Chang et al. ........................ 502/404 |
| 4,070,348 | 1/1978 | Kraemer et al. . |
| 4,089,840 | 5/1978 | Blount . |
| 4,100,149 | 7/1978 | Meiller . |
| 4,102,746 | 7/1978 | Goldberg . |
| 4,112,185 | 9/1978 | Meiller . |
| 4,118,316 | 10/1978 | Talley et al. . |
| 4,140,653 | 2/1979 | Imura et al. . |
| 4,144,190 | 3/1979 | Bowes et al. . |
| 4,262,108 | 4/1981 | Blount . |
| 4,298,500 | 11/1981 | Abbott . |
| 4,305,782 | 12/1981 | Ostreicher et al. . |
| 4,309,247 | 1/1982 | Hou et al. . |
| 4,332,694 | 6/1982 | Kalal et al. ........................ 428/407 |
| 4,344,775 | 8/1982 | Klein .................................. 502/402 |
| 4,352,884 | 10/1982 | Nakashima et al. . |
| 4,384,954 | 5/1983 | Nakashima et al. . |
| 4,384,957 | 5/1983 | Crowder, III et al. . |
| 4,415,631 | 11/1983 | Schutijser . |
| 4,449,978 | 5/1984 | Iacoviello . |

OTHER PUBLICATIONS

N. K. Boardman, J. Chrom. 2: 388–9 (1959).

*Primary Examiner*—Sam Rosen
*Attorney, Agent, or Firm*—Michael E. Zall; Samuel L. Fox

[57] ABSTRACT

A modified silica material which comprises silica covalently bonded to a synthetic polymer, the synthetic polymer being made from (a) a polymerizable compound capable of being covalently coupled directly to said silica, and (b) one or more polymerizable compounds containing (i) an ionizable chemical group, (ii) a chemical group capable of transformation to an ionizable chemical group, (iii) a chemical group capable of causing the covalent coupling of the compound (b) to an affinity ligand or a biologically active molecule or (iv) a hydrophobic compound.

36 Claims, 4 Drawing Figures

FIG. 1
CROSS-LINKED ACRYLIC SILICA COPOLYMER

MODIFIED SILICEOUS CHROMATOGRAPHIC SUPPORTS

CROSS REFERENCE TO RELATED APPLICATIONS

The present application is a continuation-in-part of copending application Ser. No. 576,448, filed Feb. 2, 1984 now U.S. Pat. No. 4,663,163, which is a continuation-in-part of application Ser. No. 466,114, filed Feb. 14, 1983, now abandoned, and is related to applicants' commonly assigned application Ser. No. 643,212, filed concurrently herewith.

BACKGROUND OF THE INVENTION

1. Field of the Invention

The present invention is directed to chromatographic supports for large scale separation and purification of biological macromolecules utilizing various chromatographic separation techniques.

The supports of the instant invention comprise a low molecular weight copolymer covalently bonded to the silica, the low molecular weight copolymer formed from at least one polymerizable compound which has a chemical group capable of direct covalent coupling to said silica particle and one or more polymerizable compounds containing organic functional groups capable of immobilizing a bio-active molecule. In the present invention, the low molecular weight copolymer is first formed and then attached to the silica particle.

2. Brief Description of the Background Art

In chromatographic separation technology, the key factor is the nature of the supporting matrix, which governs capacity, flow speed, and resolution for separation. Resolution of components in a chromatographic column is achieved by partitioning solutes between two physically distinct phases that share a common interfacial boundary, the two physically distinct phases respectively the stationary phase and the mobile phase. During the process of separating the solute mixtures by running the material through the column, the distribution of solute molecules between these two phases is a constant K, usually referred to as the partition coefficient. The partition coefficient for a solute is expressed as $K = C_S/C_M$, where $C_S$ is the concentration of solute per unit volume of stationary phase and $C_M$ is the concentration of solute per unit volume of mobile phase. Maximum resolution is achieved by choosing the two phases that produce the greatest difference in the partition coefficient of solutes. As is known to the art, the mobile phase can be modified by changing the pH and/or ionic strength of the solvent.

As is also known, the character of the stationary phase plays a substantial role in column performance. In the case of ion exchange, hydrophobic or affinity chromatography, the stationary phase is frequently immobilized on a support matrix. In ion exchange chromatography, the basis for partitioning is ionic association of solutes with anionic or cationic stationary phase bonded to the inert support.

Among the first generation of synthetic ion exchange materials were the ion exchange resins. The fundamental framework of these ion exchange resins is an elastic three-dimensional hydrocarbon network comprising ionizable groups, either cationic or anionic, chemically bonded to the backbone, a hydrocarbon framework. The network is normally fixed, insoluble in common solvents, and chemically inert. The ionizable functional groups attached to the matrix carry active ions which can react with or can be replaced by ions in the solute phase. Therefore, the ions in the solute phase can be easily interchanged for the ions initially bound to the polymeric resins. Typical examples of commercially available ion exchange resins are the polystyrenes cross-linked with DVB (divinylbenzene), and the methacrylates copolymerized with DVB. In the case of polystyrene, a three-dimensional network is formed first, and the functional groups are then introduced into benzene rings through chloromethylation. Since ion exchange resins are elastic three-dimensional polymers, they have no definite pore size, and therefore only a steadily increasing resistance of the polymer network limits the uptake of ions and molecules of increasing size. The resistance to flow exhibited by these resins is controlled by the degree of crosslinking of the resins. With the low degree of crosslinking, the hydrocarbon network is more easily stretched, the swelling is large, and the resin exchanges small ions rapidly and even permits relatively large ions to undergo reaction. Conversely, as the crosslinking is increased, the hydrocarbon matrix is less resilient, the pores of the resin network are narrowed, the exchange process is slower, and the exchanger increases its tendency to exclude large ions from entering the structure. The ion exchange resins made from polymeric resins have been successfully applied for the removal of both organic and inorganic ions from aqueous media, but they are normally unsuitable for the separation of biopolymers such as proteins. This is due, among other reasons, to the following:

(1) The highly cross-linked structure has rather narrow pores to accommodate the diffusion proteins; the proteins therefore are virtually restricted to the macro surface area of the beads with consequent limitation of solute loadings;

(2) The high charged density close to the proximity of the resin surface is unsuitable, since it causes excessive binding and distortion of protein structure;

(3) The hydrocarbon matrix is usually hydrophobic and is potentially damaging to the subtle three-dimensional structure of biopolymers, often causing denaturation of proteins.

The above limitations fostered the next generation of chromatographic materials useful for separation of proteins and other labile biological substances. This next generation of chromatographic materials was based on cellulose ion exchangers. The cellulose ion exchange materials have been made by attaching substituent groups with either basic or acidic properties to the cellulose molecule by esterification, etherification, or oxidation reactions. Examples of cationic exchange celluloses are carboxymethylated cellulose (CM), succinic half esters of cellulose, sulfoethylated cellulose, and phosphorylated cellulose. Examples of anionic exchange celluloses are diethylaminoethyl cellulose (DEAE), and triethylaminoethyl cellulose (TEAE). However, the ion exchange materials based on cellulose as the principle backbone or anchoring polymer have not enjoyed complete success due primarily to an inherent property of cellulose, its affinity for water. Thus, prior art ion exchange materials based on cellulose, while typically having high exchange capacity, are difficult to use as a consequence of their tendency to swell, gelatinize, or disperse on contact with an aqueous solution. And while these cellulosic ion exchangers are advantageous in that they lack nonspecific adsorption and have practicable pore structure, an ideal ion exchange material should only minimally interact with the solvent system which carries the ion in solution through its pores. This at most minimum interaction with the solvent system is essential to obtain a rapid, free-flowing ion exchange system.

Perhaps the most popular inner support used in the laboratory for chromatographic separation of proteins, nucleic acids, lipoproteins, peptides, and vitamins are the polysaccharides such as Sephadex ® and Sepharose ®. The success of polysaccharides as chromatographic support is primarily based upon the ability of saccharides to imbibe large quantities of water and swell into a hydrophilic matrix, the chemical stability of the hydrophilic matrix, the relative ease with which these polysaccharides can be derivatized with functional groups, and the ability of saccharides to stabilize the sensitive biological molecules.

However, these polysaccharide matrices lack mechanical strength and are extremely sensitive to change in pH, ionic strength, and pressure. These limitations become especially acute for large scale operations where it is desirable to use forced flow and drastic change of pH and ionic strength in the process of separation. Sephadex ® exhibits very low non-specific adsorption, thereby making it ideal as a matrix for biological separations. However, the porosity of ion exchange gels is critically dependent on its swelling properties, which in turn are affected by the environmental ionic strength, pH, and the nature of the counter-ions.

Swelling of gels in buffers is caused primarily by the tendency of the functional groups to become hydrated. The amount of swelling is directly proportional to the number of hydrophilic functional groups attached to the gel matrix, and is inversely proportional to the degree of crosslinking present in the gel. This characteristic swelling is a reversible process, and at equilibrium there is a balance between two forces: the tendency of the gel to undergo further hydration, and hence to increase the osmotic pressure within the gel beads, and, in opposition, the elastic forces of the gel matrix. Since the pH, the electrolyte concentration, and the nature of counter-ion can all affect the hydration, leading to a different degree of gel swelling, the pore size in the gels is not well defined but is rather dependent upon environmental conditions. Gels without crosslinking provide large pores and high capacity due to maximum swelling. However, the same non-crosslinked gels lack structural integrity and are easily crushed with a minimum amount of pressure. Removal of the solvent from the gels often results in the collapse of the matrix. In contrast, highly crosslinked gels have sufficient mechanical strength, but lose capacity and pore size due to restriction in swelling.

Also known to the prior art are ion exchange gels made from synthetic polymers. These include crosslinked polyacrylamide (Bio-Gel P ®), microreticular forms of polystyrene (Styragel ®), polyvinyl acetate (Merck-o-Gel OR ®), crosslinked poly (2-hydroxyethylmethacrylate) (Spheron ®), and polyacryloylmorpholine (Enzacryl ®). With each of these, it is possible to obtain either dimensional stability without high capacity, or high capacity without dimensional stability. It is, however, not possible to obtain both high capacity and dimensional stability at the same time.

This failure of a single component to demonstrate both high capacity and dimensional stability has led to yet another generation of ion exchange materials comprising composite structures, hybrid gels. Hybrid gels are made by combining a semi-rigid component, for the purpose of conferring mechanical stability, with a second component, a softer network, which is responsible for carrying functional groups. Agarose gel, which would otherwise be very soft and compressible, can be made stronger by hybridizing with crosslinked polyacrylamide. The crosslinked polyacrylamide component is mechanically stronger than the agarose, improves the gel flow properties, and reduces the gel swelling, but it sacrifices molecular fractionation range. Other hybrid gel examples include polyacryloylmorpholine and agarose, as well as composite polystyrene gels, large pore polystyrenes as a frame work, filled with a second type of lightly crosslinked polymer.

Yet another composite gel structure is achieved by combining inorganic materials coated with organic materials, typically the type known as Spherosil ®. Porous silica beads are impregnated with DEAE-dextran so that the product will have the mechanical properties of silica, with the ion exchange properties of DEAE-dextrans. These composites, however, have severe channeling defects arising as a result of particle packing, and they have capacity limitations on the coated surfaces.

Totally rigid inorganic supports such as porous silica or porous glass which are susceptible to degradation have also been used to provide high porosity, and high flow rate systems. However, non-specific adsorption of proteins due to the silanol groups on the silica surface is a problem. Since the hydrolysis of silica is directly related to the pH conditions, the non-specific adsorption by silica is minimal at neutral pH, but increases as the pH changes to the acidic or alkaline ranges. Prior art methods, to avoid the non-specific adsorption of silica as a result of pH changes, have involved coatings of hydrophilic organic polymers. However, these prior art coating methods have relied heavily on silane coupling agents. Structurally, the silane coupling agents have the general formula $X_3$—Si—RY, where Y is the organic functional group and $X_3$ are hydrolyzable groups. The organic functional groups (Y) are chosen for reactivity or compatibility with the bio-macromolecules, while the hydrolyzable groups are intermediates in formation of silane groups for binding to mineral inorganic surfaces. Typical silane monomers which are specifically useful for chromatography have the formula $(CH_3O)_3$-$SiCH_2R$ in which R could be amino, DEAE, or glycido (epoxy).

U.S. Pat. No. 3,983,299 to Regnier, and U.S. Pat. No. 4,029,583 to Chang et al., both assigned to Purdue Research Foundation, disclose the use of glycidoxypropyltrimethoxysilane attached on a silica support. Basically, the trimethoxy groups react with the available hydroxy groups on the silica particles leaving the oxirane ring available for later opening and attachment of the nucleophillic stationary phase. However, this method has proven to have little commercial value as the capacity of coating adhesion has been found to be rather poor.

Boardman, N. K., *J. Chromatog.* 2, pages 388 and 389 (1959) discloses formation of a thin layer of resin in the cavities of an inner porous support by precipitation copolymerization of suitable monomers in methanol solution in the presence of celite. A weak cationic exchanger which had a capacity of 0.69 meq/g was made from methacrylic acid and divinyl benzene. For preparation of a strong cationic exchanger, styrene and 5% divinyl benzene were copolymerized to a silanol-treated celite, the product subsequently sulfonated. The capacity of this resin was 0.28 meq/g. Since the resin layer is only deposited or coated on the silica surface, the bonding between the polymer and the silica is quite weak and the capacity quite low. U.S. Pat. No. 3,577,266 to J. J. Kirkland discloses a pellicular silica support wherein a porous silica is impregnated with a suitable monomer mixture containing an initiator, a crosslinked polymer being formed in the cavities of the silica gel in situ. Either an ionogenic monomer is used or the ionic groups are introduced into the polymer by subsequent chemical reaction.

Kalal et al., U.S. Pat. No. 4,332,694 discloses three-dimensional carriers of inorganic porous material (silica) in combination with a reactive polymer containing epoxy groups, a part of the epoxy groups reacting with SiOH groups on the surface of the inorganic porous material, a part of the epoxy groups available for oxidation, isomerization, or hydrolysis to effect substitution of functional groups. Kalal et al. does not distinguish between in situ polymerization and treatment of the inorganic substrate with a low molecular weight polymer containing the epoxy groups. Further, the reference does not recite modifiers which are copolymers of a reactive monomer capable of covalently bonding to the substrate and a different linking monomer capable of immobilizing biological materials.

A carrier for bioactive material is also disclosed in Nakashima et al., U.S. Pat. No. 4,352,884. The Nakashima carrier comprises a substrate coated with a copolymer. The substrate may be one of various materials, including inorganic materials such as silica. The copolymer is made of a hydrophilic acrylate or methacrylate monomer which is a hydroxy or alkoxy acyl acrylate or methacrylate, and a copolymerizable carboxylic acid or amine. The base material or substrate is coated with the copolymer with conventional coating or deposition procedures, such as spraying, dipping, phase separation or the like. The copolymer may also contain small amounts of a crosslinking agent such as glycidyl acrylate or methacrylate. The crosslinking agent allows for crosslinking treatment after the coating process and provides for the prevention of elution (presumably of the bioactive materials) from the coating layer. The amounts of crosslinking agent are quite small, they range between 0.5 and 1% by weight of the total copolymer weight. Such amounts of crosslinking agent are insufficient to cause substantial covalent bonding or grafting of the copolymer onto the underlying substrate. The copolymer in Nakashima is thus essentially only physically coating the underlying substrate. Physical coating, however, is accompanied by a series of problems. The carrier would not be expected to have an even distribution of the copolymer which shows a multi-layered structure, and may have a possible uneven distribution of functional groups.

Another reference of interest is Kraemer, U.S. Pat. No. 4,070,348, which shows copolymers of glycidyl- and amino-containing acrylates, useful as carriers for biologically active substances such as polysaccharides, enzymes, peptides, hormones, etc. The structure of the final product, in Kraemer is that of an acrylic copolymer chain covalently modified at a multiplicity of sites thereon with substances such as enzymes, proteins, and the like. In contrast thereto, in the instant invention the silica particles are coated with a plurality of acrylic copolymer chains, each chain covalently attached on the silica particle.

Good, U.S. Pat. No. 3,808,125, provides a chromatographic material which may be a packing material such as silica, the packing material having a stable uniform film of a polymeric stationary phase. The stationary phase is chemically bonded to the material, either directly or through a chemical coupling or bonding agent which has a reactive group capable of reacting with the reactive site provided by the silica, and also a reactive site capable of reacting with the polymeric agent. Typical polymeric materials described by Good are those materials derived from compounds having the formula $CH_2=C(R)_2$ wherein R can be $-COOR^2$, wherein $R^2$ may be hydrogen. Thus the polymeric film covalently coupled to the silica of Good is a polyacrylic or a substituted polyacrylic acid or other unsaturated acid. The coupling agents to be used to combine the polyacrylate to the silica must be capable of forming an integral physical or chemical bond to the polymeric film (see col. 8, lines 45-48) and are generally described as being unsaturated silanes (see col. 8, lines 70ff). Thus silica is chemically bonded to a "copolymer" made from the coupling agent polymerized onto a homo- or copolymer which may be polyacrylate or polymethacrylate. These copolymers do not carry ionic exchange groups or anchoring groups for affinity chromatography as described in the instant invention.

Kirkland et al., U.S. Pat. No. 3,795,313, at example 3, describes a siliceous material coated with a methacryloxy silane. The compound is not further reacted in any fashion in this patent and no suggestion is made of preparing polymers or copolymers bonded thereto.

Fuller, U.S. Pat. No. 3,878,092 describes silica coated with a polymer containing "at least one divinyl aromatic hydrocarbon or at least one monovinyl aromatic hydrocarbon"-derived polymer.

Thus, in spite of the vast amount of research endeavor in the area of supports for carriers for immobilization of physiologically active materials, a need has continued to exist for chromatographic supports for large scale separation and purification of biological macromolecules which have sufficient mechanical stability to withstand high flow velocity and pressure, demonstrate highly specific adsorption at various pH conditions, provide sufficient porosity to allow fast penetration of and partitioning of biological molecules through the supports, demonstrate sufficient hydrolytic stability of the bonded stationary phase and adequate hydrophilicity to permit extended operation in aqueous systems, are inexpensive to produce (the use of silane coupling agents is extremely expensive), and have a high capacity as the result of the introduction of substantial numbers of functional groups on the silica surface, thereby leading to higher column capacity.

SUMMARY OF THE INVENTION

The present invention is directed to a novel molecular support useful for ion exchange chromatography, affinity chromatography, and reverse phase chromatography industrial scale chromatographic operations and for industrial processes of ion exchange, affinity, and reverse phase chromatography. The invention is further directed to processes for the preparation of ion exchange, affinity, and reverse phase chromatographic supports, as well as chromatographic supports which are more economical and simpler to produce than the silane-coupled chromatographic supports. The supports of this invention demonstrate sufficient mechanical stability to withstand high flow velocity and pressure and also eliminate protein loss due to non-specific adsorption by silica under different pH conditions.

The present invention, as will hereinafter become more readily apparent, comprises a modified silica material which comprises silica covalently bonded to a synthetic polymer, said synthetic polymer made from a polymerizable compound which has a chemical group capable of direct or indirect covalent coupling to said silica, in combination with one or more polymerizable compounds containing an ionizable chemical group, a chemical group capable of transformation to an ionizable group, a chemical group capable of causing covalent coupling of the synthetic polymer to an affinity ligand or a biologically active molecule, or a hydrophobic chemical group. The instant invention further comprises molecular separation materials derived from the aforementioned modified silica materials in combination with a fibrous support substrate and molecular separation processes and/or biochemical reaction processes utilizing the aforementioned modified silica materials.

DESCRIPTION OF THE PREFERRED EMBODIMENT

As mentioned above, the present invention is directed to the discovery and development of modified siliceous materials which are useful insoluble supports for chromatographic separation. Additionally, however, these materials are also useful as selective adsorbents, selective electrodes, and even as insoluble supports for bioreactors. As such, the modified siliceous materials function by at least temporarily immobilizing, in a highly selective fashion, bio-active materials. The term "bio-active material" is used herein to mean any tissues, cells, enzymes, antigens, antibodies, immune complexes, complements and other serum proteins or polysaccharides or complexes thereof.

The term "silica material" is meant to include any and all siliceous materials in particulate form commonly used as carrier materials. Typically, these materials have a specific surface area of 5 to 1500 m$^2$/g, a micropore diameter of 20 to 2000 A, and a particle diameter of 1$\mu$ to 1 millimeter. Typical "silica material" includes, but is not limited to, silicate containing clay minerals including talc, kaolinite, pyrophyllite, serpentine, smectite, montmorillonite, mica, and vermiculite; synthetic silicates such as silica gels, powders, porous glass and those prepared by hydrolysis of calcium silicide or sodium silicate; and biogenic silicas such as kieselguhr and diatomaceous earth. However, the silica material of the instant invention is characterized by surface hydroxy groups through which covalent coupling with the attached synthetic polymer is effected.

The term "synthetic polymer" encompasses either copolymers of homopolymers. When the chemical groups capable of coupling to the silica particles are the same as the chemical groups useful as anchoring units for immobolizing the bio-active material, the synthetic polymer is a homopolymer. More commonly, the polymer is a copolymer containing groups capable of coupling to the silica and also different groups capable of serving as anchoring groups for the bioactive material. In its most general form, the copolymer could be a random, a block, or an alternating copolymer.

Typically, the synthetic polymer comprises (a) a polymerizable compound which has a chemical group capable of covalent coupling to silica, and (b) one or more polymerizable compounds containing a chemical group capable of at least temporarily immobilizing bio-active materials. Typical polymerizable compounds in category (b) above include (i) an ionizable chemical group, (ii) a chemical group capable of transformation to an ionizable group, (iii) a chemical group capable of causing the resulting polymer to bind to an affinity ligand or a biologically active molecule or (iv) a hydrophobic chemical group. By covalent coupling is intended direct covalent coupling as well as indirect coupling through a bridge compound.

The polymerizable compound (a) above, the compound which has a chemical group capable of covalent coupling to silica, includes those compounds which contain a hydroxy reactive group. Preferably, the hydroxy reactive group-containing comonomers (a) are those monomers which contain a glycidyl group. The glycidyl group-containing monomers are the epoxy ethers and esters formed between the glycidyl alcohol and an unsaturated alcohol or unsaturated carboxylic acid, respectively. The glycidyl alcohols are aliphatic and cycloaliphatic alcohols and ether alcohols having from 3 to 18 carbon atoms which are esterified with an alpha, beta-unsaturated carboxylic acid, preferably acrylic or methacrylic acid, or etherified with an olefinically or acetylenically unsaturated alcohol. Typical compounds are glycidyl acrylate and methacrylate; 4,5-epoxypentyl acrylate; 4-(2,3-epoxy-propyl)-N butyl-methacrylate; 9,10-epoxy-stearyl acrylate; 4-(2,3-epoxy-propyl)-cyclohexyl methacrylate; ethelene glycol-monoglycidyl ether-acrylate; and allyl glycidyl ether. Other hydroxy reactive groups include N-methylol groups and anhydride groups.

By the process of the instant invention, silica is utilized as a supporting core material only, thus permitting porosity to be controlled through the polymer matrix covalently linked to the silica surface. Thus, high silica surface area becomes less critical.

The polymerizable comonomer (b) will vary depending on the ultimate use of the carrier material. If the carrier material's ultimate use is to serve as an ion exchange chromatographic material, the comonomer (b) may contain any of the well-known ionizable chemical groups or precursors thereof such as compounds containing a vinyl or vinylidine group and a carboxylic acid, a carboxylate salt, a carboxylate ester (preferably having 1 to 6 carbon atoms), a carboxylic acid amide, a secondary or a tertiary amine, a quaternary ammonium, a sulfonic acid, a sulfonic acid ester, a sulfonamide, a phosphoric or phosphonic acid, or a phosphoramide or phosphonamide group.

When comonomer (b) carries the precursor of a material having ion exchange properties, the ion exchangeable group itself can be obtained by unmasking, such as for example, by selective hydrolysis of an anhydride, ester or amide, or salt formation with an appropriate mono-, di- or trivalent alkali or alkaline earth metal, as is otherwise well known in the art.

Preferred ion exchange functionalities for comonomer (b) are aminoethyl, carboxymethyl, carboxyethyl, citrate, diethylaminoethyl, dimethylaminoethyl, ecteola (mixed amines), guanido ethyl, phosphonic acid, p-aminobenzyl, polyethylene imine, sulphoethyl, sulphomethyl, triethylaminoethyl, or chelating groups such as $-N(CH_2CO_2H)_2$.

When the ultimate use of the carrier material is as a support for an affinity ligand, comonomer (b) carries a chemical group capable of causing the covalent coupling of said comonomer (b) to an affinity ligand, i.e. an "anchoring" group. Since most affinity ligands carry nucleophiles such as hydroxy, amino, thiol, carboxylate, and the like, any electrophilic group capable of reacting with such nucleophile can be present in comonomer (b). Such electrophilic groups include, but are not limited to, those described as active groups capable of reacting with the hydroxy group of cellulose. They also include activated carboxy groups used in peptide chemistry for the formation of peptide bonds, such as carbonyl chlorides, carboxylic anhydrides and carboxylic acid azide groups, as well as phenyl esters and aldehydes used for the formation of Schiff (imine) bases.

Also useful are the carboxylates of hydroxylamino derivatives of the formula (1)

(1)

in which R is an alpha, beta-unsaturated, polymerizable radical and $R_1$ and $R_2$ are identical or different $C_1$–$C_6$ alkyl or alkanoyl groups. $R_3$ may be a direct bond (—) or a $C_2$–$C_3$ alkyl group. $R_1$ and $R_2$ together with the N atom may also form a heterocyclic ring. Typical compounds of this type are (2):

Other compounds having activated carboxyl groups include acryloyl and methacryloyl chloride, acrylic and methacrylic anhydride, maleic anhydride, phenyl acrylate and methacrylate, glycidyl acrylate and methacrylate, 4-iodobutylacrylate and methacrylate and 2-isopropenyl-4,4-dimethyloxazolone-5. The last mentioned compound is capable of reacting with the terminal amino group of proteins.

Further useful are those compounds having the general formula (3):

(3)

where R, $R_1$, $R_2$ and $R_3$ are as described above.

A very useful potentially electrophilic reactive group in comonomer (b) useful for coupling to an affinity ligand is a group capable of being activated to an electrophilic group with a reagent such as a cyanogen halide. It is known in the art that cyanogen halides react with 1,2-diols to yield activated structures of the following type:

This structure is then capable of reacting with the nucleophile of an affinity ligand. Among the preferred 1,2-diols present in comonomer (B) are various saccharides, including monosaccharides such as glucose, mannose and galactose, disaccharides such as lactose and maltose, trisaccharides such as raffinose or, generally, glycosides. The 1,2-diol-containing functional group can be attached to the polymerizable comonomer (b) by such reactions as esterification, amide formation, esterification and the like. Among the most preferred of these is the reaction of glycidyl acrylate or methacrylate with a saccharide, to yield an ether-containing comonomer (b).

When the ultimate use of the carrier material is as a carrier for biological molecules, any of the anchoring groups mentioned for comonomers (a) or (b) can also be used. Other types of activated groups such as those containing aldehydes or amines can also be used.

The polymerizable comonomer (b) can be substantially of one type or can be a mixture of one or more types. This is particularly applicable when the ultimate use of the material is as an ion exchange carrier. Comonomer (b) can then contain such functional groups as anionic exchange groups and cationic exchange groups in various different ratios, if desired.

Preferably, the polymerizable monounsaturated compounds (b) are polymerizable compounds of the formula (4):

(4)

wherein $R_4$ is hydrogen or methyl;

A is CO, or $SO_2$;

X is OH, OM (where M is a metal ion), $OR_5$ (where $R_5$ is a straight or branched chain $C_1$–$C_{18}$ alkyl group), $OR_6OH$ (where $R_6$ is a straight or branched chain $C_2$-$C_6$, alkyl or aromatic group), $NR_7R_8$ or $NR_7R_8R_9$ (where $R_7$ is the same as different as $R_8$ which is the same or different as $R_9$, and are hydrogen, $R_5$ or $R_6OH$);

AX may also have formula (5):

(5)

wherein Y is $-CO_2^-$, $-CH_2CO_2^-$, $-SO_3^-$, $-CH_2SO_3^-$, $-PO_4H^-$, $-CH_2PO_4H^-$, $-CH_2N(CH_2COO^-)_2$, $-CH_2-NR_7R_8$, or $-CH_2-NR_7R_8R_9$, or the corresponding free acid, ester, or partial ester groups, as described previously. In these formulae, the groups $R_7$, $R_8$; $R_7$, $R_9$, or $R_8$, $R_9$ may form a 5-7 membered heterocyclic ring with the nitrogen atom. $R_7$, $R_8$, and $R_9$ are as previously defined.

Alternatively, and when the material is to be used as an anchor for affinity ligands or biomolecules, A is CO or $SO_2$, and X is most preferably $O-CH_2-CH(OH)-CH_2-$saccharide, where "-saccharide" is a mono-, di- or polysaccharide having a group which can be activated for reaction with nucleophilic reactive groups on the affinity ligand or the biomolecule by a cyanogen halide.

The preferred comonomer (a) for anion exchange materials is glycidyl acrylate or methacrylate. The preferred comonomer (b) for anion exchange materials is diethylaminoethyl acrylate or methacrylate or dimethylaminoethyl acrylate or methacrylate. The most preferred comonomer (b) for anchoring materials is the comonomer obtained from reaction of glycidyl acrylate or methacrylate with glucose, or glycidyl acrylate or methacrylate.

The preferred comonomer (b) for cation exchange materials is methacrylic acid, acrylic acid and acrylic acid dimer, or glycidyl methacrylate further oxidized to a sulphonic, phosphonic or carboxylic acid group after polymerization.

The average molecular weight of the silica-modifying polymer is dependent on the amount of monomers present therein. It is required to have at least a sufficient amount of comonomer (a) so as to be able to form covalent attachment throughout the silica. The amount of comonomer (b) cannot be too small, since otherwise the exchange capacity, or the anchoring/interacting capacity is negligible. Nor can the amount of comonomer (b) be too high, since this would cause great difficulty in the reaction between the reactive groups of comonomer (a) and the silica. Preferably, the silica-modifying copolymer carries anywhere between 1 and 500 units (a) plus (b), most preferably between 20 and 100 units. This corresponds to molecular weights of between about 1,000 and 1,000,000 preferably between 5,000 and 50,000.

The low molecular weight and low degree of crosslinking provide sufficient porosity to allow fast penetration and partitioning of biological molecules through the support while the silica core provides the necessary structural strength and integrity. If the molecular weight of the copolymer exceeds these limits, poor adhesion to the silica results, as well as low porosity resulting in retarded migration of the bioactive materials.

Other neutral comonomers (c), different than those represented by (i), (ii), (iii) or (iv) supra, can also be added to the polymer, if desired. These comonomers may be polymerizable unsaturated compounds carrying neutral chemical groups such as hydroxy groups, amide groups, alkyl groups, aryl groups and the like. Preferred among comonomers (c) are $C_1$-$C_6$ alkyl acrylates or methacrylates, or the corresponding hydroxy alkyl acrylates or acrylates. The function of comonomers (c) may be to increase the presence of hydrophobic or hydrophilic residues in the polymers, so as to provide a desired balance of hydrophilic and hydrophobic groups, if necessary.

The minimum ratio of comonomer (a) to total comonomer content is important. The synthetic polymer should have a sufficient amount of comonomer (a) to permit substantial covalent coupling of the polymer to the silica. If too little comonomer (a) is present in the polymer, then grafting becomes difficult, if not impossible. Generally, about 4-12, preferably 5-10% by weight of comonomer (a) relative to the total of (a) plus (b) (and (c) if any is present) is needed. Amounts of about 0.5 to 1 or 2% by weight appear merely to crosslink the polymer, without substantial grafting onto the silica.

The upper limit of comonomer (a) in the polymer can be varied up to 99.9% by weight, depending on the desired amount of rigidity, functionality and hydrophilicity. Increasing the amount of comonomer (a) to much above 15 to 20% by weight, however, decreases the porosity. Large molecules then have difficulty in gaining full access to the functional groups in comonomer (b). It is preferred to have a predominance of comonomer (b) over comonomer (a). Comonomer (c) may be present in an amount of up to 20 percent by weight of the total (a) plus (b) plus (c).

The weight ratio of silica to the modifying polymer is freely adjustable, and varies from 0.1 to 5 weight parts of copolymer to parts by weight of the silica. The preferred modified silica contains 40 to 180 weight percent of the copolymer, based on the weight of the silica. Where less than 40% polymer is employed, the resulting support provides a low capacity with high diffusion rate, while greater than 100% polymer weight provides high capacity with low diffusion rate.

When comonomer (b) carries ionizable chemical groups capable of providing cation exchange capacity, it is found that unless some degree of crosslinking is provided, the flexibility of the material in solution tends to favor the formation of micelle-type aggregates and slow loss of capacity. Therefore, it is a preferred mode of the invention to provide polymeric crosslinking for these types of modified silica. Crosslinking can be provided either by incorporating into the polymerization recipe a small amount of polyunsaturated comonomer having at least two polymerizable alpha, beta-carbon double bonds, such as for example mono- and polyethylene glycol dimethacrylates and diacrylates (with the polyethylene glycol residue containing up to 6 ethylene groups), ethylene dimethacrylate, ethylene diacrylate, tetramethylene dimethacrylate, tetraethylene diacrylate, divinylbenzene, triallyl cyanurate, methylene-bisacrylamide or -bis-methacrylamide, and the like.

Another type of crosslinking agent is particularly applicable to copolymers made from an aminoalkyl comonomer (b). Because of the presence of a free pair of electrons on the aminoalkyl nitrogen atoms, crosslinking can be carried out with such bifunctional reagents as would react with nitrogen free electron pairs. Among these are the diacyl halides, such as $Hal-CO-(CH_2$-

)$_n$—CO—Hal, or the alkyl dihalides, such as Hal—(CH$_2$)$_n$—Hal, wherein Hal is a halide such as chloride, bromide or iodide, and n may be anywhere between 2 and 12. Other bifunctional reagents capable of reaction with nitrogen atoms can also be used, for example Hal—CO—phenyl—CO—Hal and Hal—phenyl—Hal. The advantage of these bifunctional reagents is that they simultaneously crosslink the copolymer, while also providing a cationic charge at the nitrogen centers, thereby ionizing the material. Yet another type of crosslinking agent is where n is 2 to 12.

The amount of crosslinking agent is best determined empirically. It is to be considered sufficient when the polymer preserves the ion exchange capacity at a constant value over time, yet would be too high if swelling is prevented, and too much rigidity is obtained in the final materials. Ideally, an amount of crosslinking agent between 1 to 20 mole percent of the synthetic polymer units is sufficient, the amount dependent upon one size of the molecule being separated. A preferred range is 1 to 5 mole percent.

The term "affinity ligand", as used throughout the present application and in the claims, is meant to include any small or high molecular weight molecule which can be immobilized in a stationary phase and used to purify a complementary binding molecule from a solute phase by affinity chromatography. For example, a ligand can be an inhibitor, a cofactor, a prosthetic group, or a polymeric substrate, all of these useful to purify enzymes or holoenzymes. Other ligand/ligate pairs are enzyme/polymeric inhibitors; nucleic acid, single strand/nucleic acid, complementary strand; hapten or antigen/antibody; antibody/proteins or polysaccharides; monosaccharides or polysaccharides/lectins or receptors; lectins/glycoproteins or receptors; small target compounds/binding proteins; and binding protein/small target compounds. When antigen/antibody pairs are used as the ligand/ligate pair, the technique takes the particular name of "immunoaffinity" chromatography.

The "biologically active molecule" which can be bound to the carriers of the invention can include enzymes, enzyme substrates, inhibitors, hormones, antibiotics, antibodies, antigens, peptides, saccharides, nucleic acids, and the like. The only requirement for these molecules is that they have reactive groups thereon which can be covalently coupled to the anchoring chemical groups on comonomer (b).

Of particular interest is the immobilization of enzymes such as hydrolases, isomerases, proteases, amylases, and the like. These immobilized enzymes can then be used in biochemical reactors, as is otherwise well known in the art.

The use of the term reverse phase chromatography or "hydrophobic interaction chromatography" is meant to include chromatography used to adsorb hydrophobic components in mixtures. Such components include lipids, cell fragments and the like. In this embodiment, comonomer (b)(iv) is usually an acrylate or methacrylate ester of C$_6$–C$_{18}$ straight or branched chain alcohols, or of aromatic alcohols such as phenol or naphthol.

The carrier materials of the present invention can be used per se in the same manner as other silica-based carrier materials of the prior art. The modified silica media can also be incorporated in unmodified fibers of various different sizes, and, in addition, can also be present together with other modified or unmodified particulate material. When a particulate is present, it is prefered to modify it so that it is also effective for molecular or ionic separations or reactions. Such a particulate should be contained in the fibrous phase in an amount effective to achieve the desired separations or reactions. The overall media is substantially inert and dimensionally stable.

The preferred other particulates which can be used include all of those substances which can be provided in finely divided form and exhibit chromatographic functionality, i.e., capable of effective molecular separations and/or reactions. Mixtures of such compositions may also be utilized. Exemplary of such particulates are alumina, zirconium oxide, diatomaceous earth, perlite, clays such as vermiculite, carbon such as activated carbon, modified polymer particulates such as other ion exchange resins, crystalline cellulose, molecular sieves, and the like, the surfaces of which may be modified in a conventional manner.

The particle size of the other particulate is not critical but influences somewhat the flow rate at which the sample to be treated passes through the material. Usually, uniform particle sizes greater than about 5 microns are preferred, with about 10–100 microns constituting a practical operational range. The amount of the particulate can vary widely from about 10 wt. % up to 80 wt. % or more of the solid phase. The optimum particulate concentration will vary depending on the molecular separation desired.

The fibrous media should be capable of immobilizing the particulate contained therein, i.e., capable of preventing significant particulate loss from the stationary phase, yet having a porosity which enables the fluid to pass through the media. It is also possible to utilize extra fibers or binders. Other fibers usable for the media include polyacrylonitrile fibers, nylon fibers, wool fibers, rayon fibers and polyvinyl chloride fibers, and cellulose fibers such as wood pulp and cotton, and cellulose acetate.

Another embodiment of the invention employs a structural fiber which assists in providing sheets of sufficient structural integrity in both the wet "as formed" condition, and in the final dry condition, and also allows handling during processing as well as suitability for the intended end use. Such fibers are typically relatively large, with commercially available diameters in the range of 6 to 60 micrometers. Wood pulp can also be used and has fiber diameters ranging from 15 to 25 micrometers, and fiber lengths of about 0.85 to about 6.5 mm. The unrefined self-bonding structural fibers typically have a Canadian Standard Freeness of +400 to +800 ml. Canadian Standard of Freeness is defined in U.S. Pat. No. 4,309,247, incorporated herein by reference. These long self-bonding fibers may constitute greater than 50% of the fibrous media, by weight, preferably 60–100% of the fibrous media, and most preferably 100%. Optionally, a minor portion of cellulose pulp which has been refined to a Canadian Standard Freeness of between +100 and −600 ml may be incorporated with a major portion of the normally dimensioned cellulose pulp (+400 to +800 ml). In particular, from about 1 to about 20% of the refined pulp and about 50% to about 90% of the unrefined cellulose may be contained in the matrix. Particulate may also be added.

When the particulate materials are millimicron-size, it may be desirable to use, in addition, a mixture of cationic and anionic resins as described by assignee's co-pending U.S. patent application Ser. No. 347,360, filed on Feb. 9, 1982. Alternatively, one may use a medium containing, in addition to the millimicron-size particles, a neutral organic polymeric resin having oxygen atoms along the polymeric backbone thereof, as described in the assignee's co-pending U.S. patent application Ser. No. 401,361, filed on July 23, 1982.

Also of particular interest in the present invention is the use of modified cellulosic fibrous media such as those described in co-pending commonly assigned U.S. patent application Ser. No. 576,448, filed Feb. 2, 1984, incorporated by reference.

It is also within the contemplation of the instant invention to utilize the modified silica in combination with modified cellulosic material as described in co-pending U.S. application Ser. No. 576,448, further in combination with other prior art inorganic support materials, such as those described in Regnier, U.S. Pat. No. 3,722,181, Mazarquil et al., U.S. Pat. No. 4,034,139, Talley et al., U.S. Pat. No. 4,118,316, Ho Chang et al., U.S. Pat. No. 4,029,583, Regnier, U.S. Pat. No. 4,108,603, and co-pending U.S. application Ser. No. 643,212, filed concurrently herewith, all incorporated by reference herein. In this embodiment then, both the cellulosic fiber and the siliceous particulate are modified, and their interaction provides increased anchoring and/or ion exchange capacity. The addition of particulate material tends to increase the rigidity and strength of the fibrous media and renders it readily useful for industrial applications, especially those involving high pressure.

PROCESS OF PREPARATION

The polymer-modified silica material of the instant invention is prepared, generally speaking, by forming the synthetic polymer and then condensing this synthetic polymer through its hydroxy reactive groups to the silica.

Polymerization of the comonomers can be carried out by radical chain, step-reaction, ionic, and coordination polymerization. Radical polymerization is especially useful and the preferred mode.

The free radical addition polymerization of radical polymerizable comonomers is carried out with free radical initiators using the well-known steps of initiation, addition, and termination. A usual procedure is to utilize a substance or substances which produce radicals capable of reacting with the monomers. Probably the simplest of all polymerization initiators are the organic peroxides and azo compounds. These substances decompose spontaneously into free radicals in common organic solvents at a finite rate, at temperatures between 50° and 140° C. For example, benzoyl peroxide decomposes into two benzoyloxi radicals at 60° C. Another example is afforded by the azo compound azobisisobutyronitrile which similarly decomposes into radicals at easily accessible temperatures.

The required free radical forming energy may be provided by irradiating the initiator system with ultraviolet light. For example, initiation can be provided by irradiating the initiator system in the presence of initiators such as benzophenone and its derivatives, benzoin alkyl ethers or derivatives, or acetophenone, with ultraviolet light. Finally, biomolecular reactions may produce radicals capable of initiating polymerization. Particularly important are the redox reactions, which occur in aqueous media, and involve electron transfer processes. For example, the systems Fe(II) plus hydrogen peroxide, or Ag(I), plus $S_2O_8^{-2}$ are particularly important in initiating the radical polymerization of monomers. Because of the low temperatures of initiation, the redox initiators or photochemically induced initiators are particularly preferred in the present invention. The amount of initiator is that sufficient to initiate the polymerization reaction. Polymerization is carried out until substantially all of the monomers or comonomers are then incorporated to the polymeric chains. This can be readily ascertained by simple analytical tests on the reaction mixture.

The most preferred method for preparing the modified silica particle of the instant invention comprises forming a very low molecular weight copolymer first and then pouring in the silica particles under conditions such that one component of the polymer will be opened up and be coupled on the silica surface to achieve better and stronger bonding between the organic polymer and the inorganic support. In this preferred process, depicted graphically immediately below, a polymerizable monomer containing a hydroxy-reactive group (coupling group) is polymerized with a polymerizable monomer containing a group capable of immobilizing a bio-active material (functional group) in the presence of an appropriate catalyst. In the formula below, the polymerizable monomer containing the coupling group is glycidyl methacrylate and polymerizable monomer containing the functional group is diethylaminoethyl methacrylate (DEAEMA), and the catalyst is a mixture of ammonium persulfate ($(NH_4)_2S_2O_8$) and sodium thiosulfate ($Na_2S_2O_3$).

In the next step of the process, the copolymer prepared above is coupled to silica, the hydroxy-reactive end group of the thus-formed copolymer opening up and coupling covalently to the surface hydroxy groups of the silica. This step of the process is depicted immediately below as follows:

The conditions such as temperature, pH, catalyst, etc. required for the coupling reaction are known to the art or may be readily determined by routine experimentation in combination with the disclosure of this application. Thus one with ordinary skill in the art may readily determine the conditions best suited for the coupling of the pre-formed polymer to the silica substrate in light of the information made available herein in combination with that technology already in the public domain.

Figure 1:
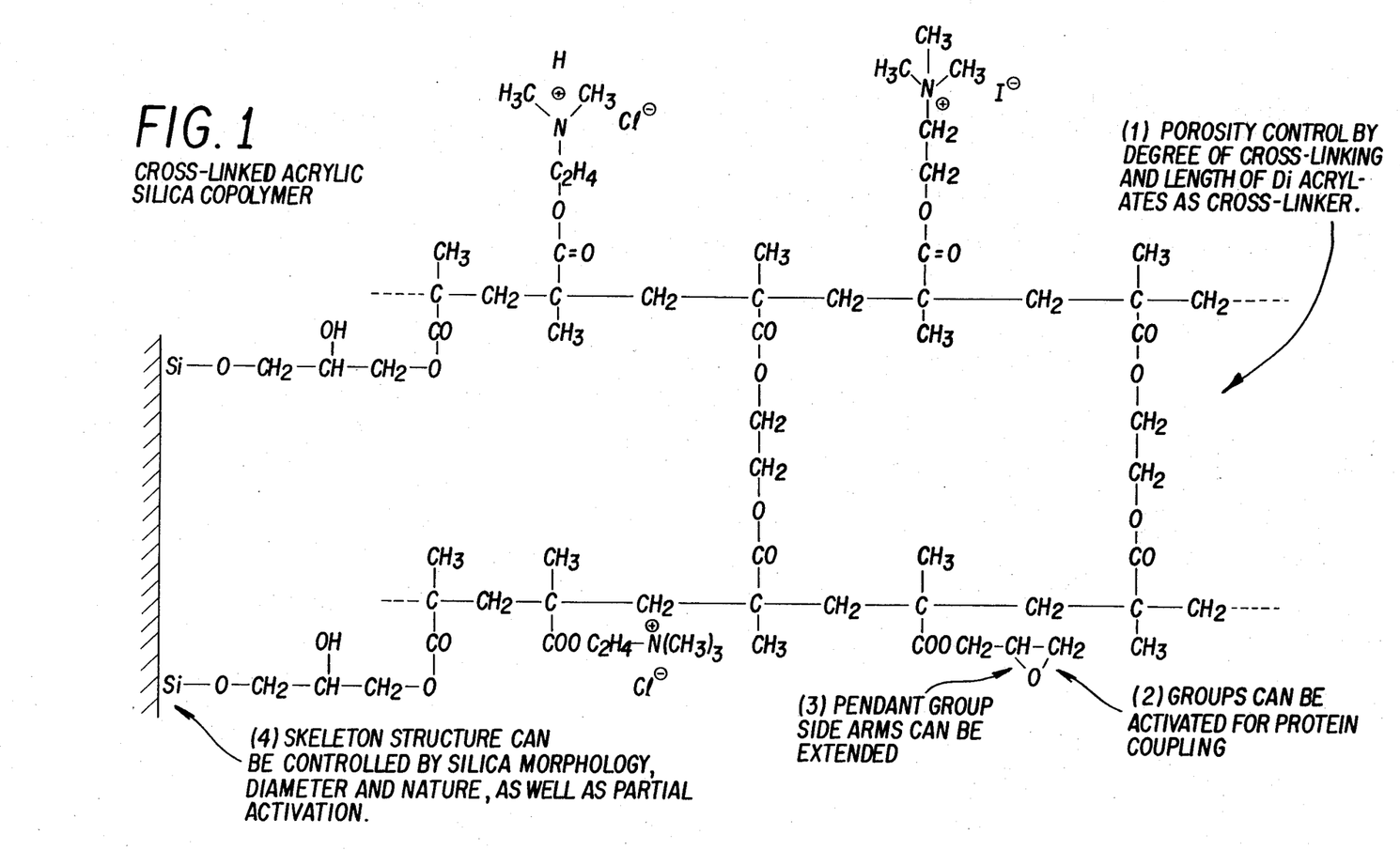
FIG. 1 is a structural formula representation of a modified silica in accordance with the present invention.

At this point, depending on the porosity and structural integrity desired, the copolymer, covalently linked to the silica particles, is crosslinked and/or quaternized by reaction with the appropriate crosslinked and/or quaternizing agent. Quaternization of amino acryl functions can be carried out simultaneously with crosslinking by reacting the modified silica with, for example, diacyl halides, acyl dihalides, or alkyl dihalides at a ratio of 2 to 70 parts, preferably 10 to 50 parts, of the halides per 100 parts of silica at appropriate temperature, time, and solvent conditions. FIG. 1 is a structural formula representation of modified silica crosslinked and quaternized.

Figure 2:
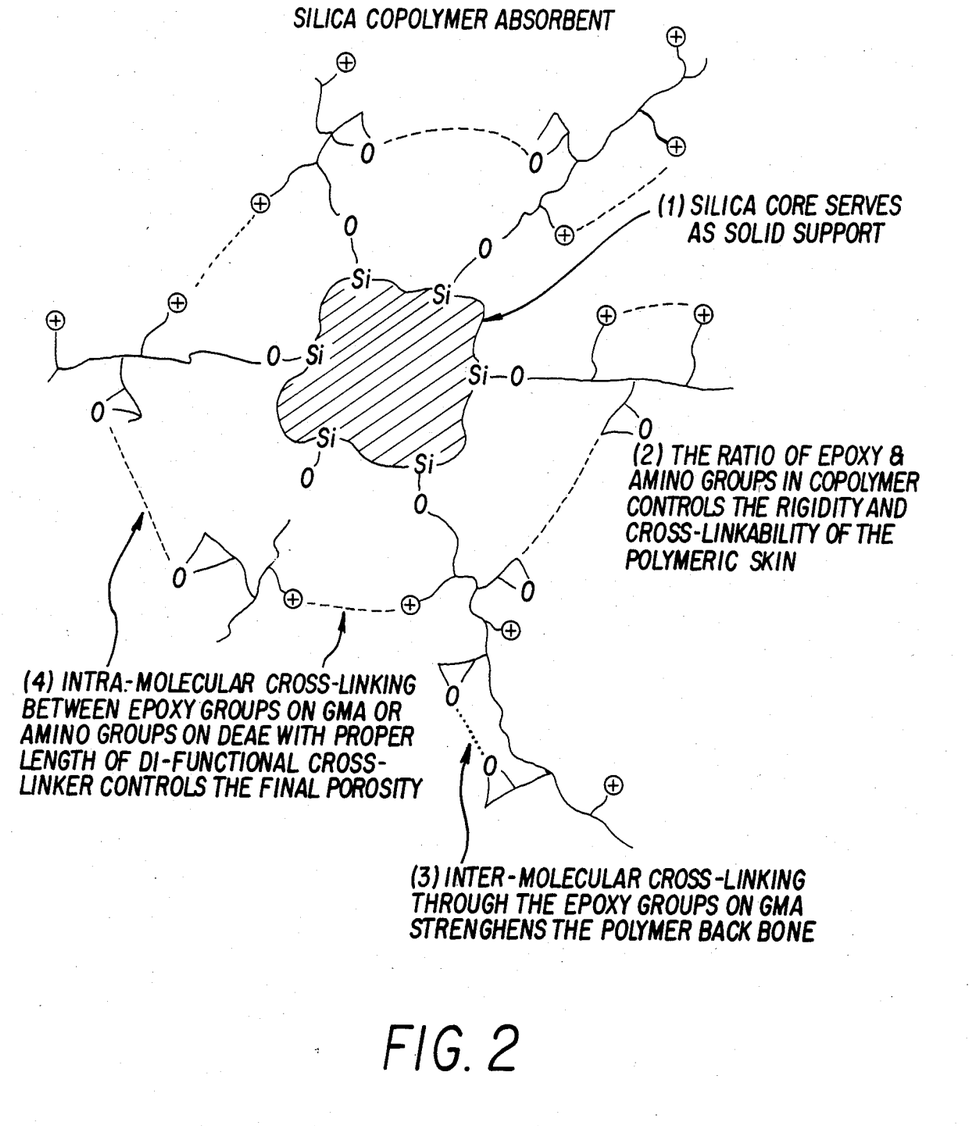
FIG. 2 is a structural formula representation of another modified silica in accordance with the present invention.

FIG. 2 is a structural formula representation of a modified silica depicting potential crosslinking sites. By crosslinking the inter-polymer chains, porosity of the final product is controlled, thereby permitting one to tailor the modified silica to the particular molecule size in question. By crosslinking the intra-polymer chains, the strength of the polymer may be controlled.

Another further reaction of the modified silica materials would be to anchor the affinity ligands or biologically active molecules to the anchoring group of the copolymer. This reaction can readily be accomplished by mixing in an appropriate solvent, normally aqueous, the affinity ligand or biomolecules to be anchored and the modified silica and carrying out anchoring for a time and under conditions to cause covalent coupling therebetween.

The modified siliceous supports are characterized by excellent structural integrity, high binding capacity, especially for large protein molecules, low non-specific adsorption and, further, are well suited for individual "tailoring" to specific needs by controlling the degree of crosslinking of the polymer grafted to the siliceous substrate. Using bovine serum albumin binding capacity as a representative standard, the modified siliceous supports of the present invention provide surprisingly and unexpectedly high BSA binding capacity as compared to the prior art, while still retaining excellent structural characteristics and resistance to collapse. Typically, the BSA binding capacity of the supports of this invention are in the range of 600–900 milligrams of protein per gram of modified silica. At the same time, these modified supports retain excellent flow-through characteristics even in view of their superior binding capacities.

In general, the modified silicas of the present invention are characterized by very high exchange capacity (EC) where EC is expressed in terms of milliequivalents of the organic functional group-containing monomer per gram of silica (meq/g). Typically, the modified silicas of the present invention have an exchange capacity in excess of 2, frequently in excess of 3. See Examples 26–32 below. Applicants believe, but do not intend in any way to be limited by this belief, that this exchange capacity is a result of the process wherein the monomers are first polymerized and then covalently coupled to the silica support, thereby providing exchange capacity in excess of that previously available.

The conditions such as temperature, pH, catalyst, etc. required for the coupling reaction are known to the art or may be readily determined by routine experimentation in combination with the disclosure of this application. Thus, one with ordinary skill in the art may readily determine the conditions best suited for the coupling of the pre-formed polymer to the silica substrate in light of the information made available herein in combination with the technology already in the public domain.

A self-supporting fiber matrix using the modified silica of the invention can be made by vacuum filtering an aqueous slurry of fibers and, if desired, additional resins and modified particulate. This forms a sheet having uniformly high porosity, fine pore-size structure and excellent flow characteristics, the sheet substantially homogeneous with respect to fiber, resins, and particulate. Typically, the vacuum filtration is performed on a foraminous surface, normally a woven wire mesh which, in practice, may vary from 50 mesh to 200 mesh, with mesh openings ranging from 280 micrometers to 70 micrometers, respectively. Finer meshes are unsuitable because of clogging problems and/or structural inadequacy.

The sequence of adding the overall components to the slurry (modified silica, other fibers, particulate, other modified particulate, other resins, etc.) is relatively unimportant, provided that the slurry is subjected to controlled hydrodynamic sheer forces during the mixing process. The slurry is normally prepared at, say, about 4% consistency and then diluted with additional water with a proper consistency required for vacuum filtering and sheet formation. This latter consistency will vary depending upon the type of equipment used to form the sheet. Typically, the slurry is cast into a foraminous surface, vacuum filtered, and dried in the conventional manner.

The flat, dimensionally stable sheet may be of any desired thickness and is then cut to the appropriate dimensions for each type of application. Preferably, the wet sheet is often dried and then cut to proper size in order to form discs. These discs may be loaded into an appropriately sized cylindrical column to form the desired medium, the disc and cylinder preferably in interference fit so that the disc can be pushed into the cylinder without distortion, but not fall under gravitational force. A pump may be used to pump solvent through the elements stacked in the column. Preferably, the elements swell to form a substantially tight edge seal to the cylinder wall. Because the individual elements are dimensionally stable, the column is not sensitive to orientation or handling, a problem which is common with other chromatographic media, particularly with any gel-type media.

In one embodiment as disclosed by the commonly assigned application Ser. No. 505,532 of Leeke et al., filed June 17, 1983, a chromatography column for effecting chromatographic separation of at least two components of a sample flowing through the column, comprises a housing and at least one solid stationary phase within the housing. The stationary phase has chromatographic functionality and is effective for chromatographic separation. Means are provided for radially distributing the sample through the stationary phase and for collecting the sample after the sample has flowed through the stationary phase. The stationary phase comprises:

(a) a swellable fibrous matrix in sheet form having chromatographic functionality and being effective for chromatographic separation, spirally wound around the longitudinal axis of the solid stationary phase to form a plurality of layers around the axis; and (b) a spacer means between each layer for permitting controlled swelling thereof and enhancing the distribution of sample flowing radially through the stationary phase. The solid stationary phase may be fabricated into a cartridge form for placement in the housing. A plurality of cartridges may be used either in series or parallel flow configuration in a single housing. The swellable fibrous matrix comprises the modified silica of the present invention dispersed in a fibrous matrix wherein the fibrous matrix is as described above.

Alternatively, of course, the particles may be appropriately packed into a column and used in particulate form.

The ion exchange, affinity, reverse phase, or bioactive materials of the invention can be used in any of the well-known prior processes of ion exchange, affinity, or reverse-phase chromatography, or as supports for bio-reactors. Because the monomers employed in the process of the instant invention are less expensive than the silane coupling agents of the prior art, the instant process and product is more economical and simpler than the prior art silane reaction products. Additionally, by utilizing silica as a core in the structure of the chromatographic material, sufficient mechanical stability to withstand high flow velocity and pressure is obtained. By coating the silica particle with an acrylic polymer, the protein loss due to non-specific adsorption of silica at high and low pH is avoided. Additionally, the use of a structural silica pore permits the use of polymers which are either non-crosslinked or crosslinked only to a very low degree, thereby providing a porosity which will allow fast penetration and partitioning of biological molecules through the support.

Surprisingly, it has also been discovered that chromatographic media made in accordance with this invention wherein comonomer (b) is a quaternized diethyl- or dimethylaminoethyl acrylate or methacrylate, when used in combination with carbonaceous water purification media, are effective in preventing the colonization of bacteria within the filtration media. Thus, the present invention is of particular value in extending the useful life of these known carbonaceous purification media.

The chromatographic media have further utility as molecular separation in the fractionation and purification of blood, particularly with regard to treatments for separating various blood fractions.

Finally, the supports of the instant invention have a capacity which far exceeds that of the supports of the prior art where silane coupling agents are employed. Based on Thermal Gravametric Analysis, the weight gain on silica through silanization is less than 20% whereas more than 50% weight gain can be achieved by the instant process. Thus, more functional groups are introduced on silica surface, leading to higher column capacity.

Additionally, the rigidity of the matrix allows the column to be operable in unrestricted diameter for high volume processes. The column volume is virtually unaffected by changing pH or ionic strength in the buffer solution. Such a system can be equilibrated and regenerated in a short period of time, eliminating cumbersome procedures of column preparation and regeneration.

Having now generally described this invention, the same will be better understood by reference to certain specific examples which are included herein for purposes of illustration only, and are not intended to be limiting of the invention unless otherwise specified.

EXAMPLE 1:

Formation of Low Molecular Weight Acrylic Copolymer 25 ml of diethelaminoethyl methacrylate (DEA-EMA) and 2.5 ml of glycidyl methacrylate (GMA) were well mixed in a separate container and poured into a closed reactor containing 500 ml of $H_2O$. Nitrogen gases were bubbled through the reactor to remove air and to agitate the mixture for 5 minutes. 1 gram of ammonium persulfate and 1 gram of sodium thiosulfate were dissolved in 20 ml of $H_2O$, and this aqueous mixture of catalysts then poured into the reactor solution. The reactor temperature was maintained at 40° C. for 2 minutes, the excess catalyst and short reaction time producing a low molecular weight copolymer (optionally, a chain transfer agent could be added to further prevent the molecular weight build-up).

EXAMPLE 2

Coupling of the Low Molecular Weight Polymer Thus Formed on Silica Surface

To the low molecular weight polymer of Example 1, containing excess catalyst, were added 10 grams of silica particles, grade 952 from Davidson Chemicals. The pH of the reactor was raised to 9.0 and the temperature to 90°–95° C. for 1 hour. At this pH and temperature, the polymerization reaction between the DEA-EMA and GMA was terminated and the epoxy groups of the acrylate copolymer reacted with the the surface hydroxy group on the silica particles. The modified silica particles were then filtered, washed with water, washed with methanol, and recovered.

EXAMPLE 3

CrossLinking and Quaternization of the Polymer

The modified silica particles of Example 1 were returned to the reactor, said reactor containing 100 ml methyl ethyl ketone mixed with 100 ml of water. 10 ml of of 1.6 dichlorohexane and 0.6 gram of potassium iodide were added to the reactor and the reactor allowed to reflux overnight. The resulting product was filtered, washed with acetone and given an acetone wash followed by a water wash. Finally, the product was acidified with 10 ml of 2 normal HCL and then washed with water until the wash solution has a pH of about 5.

EXAMPLE 4

Product Characterization

Figure 3:
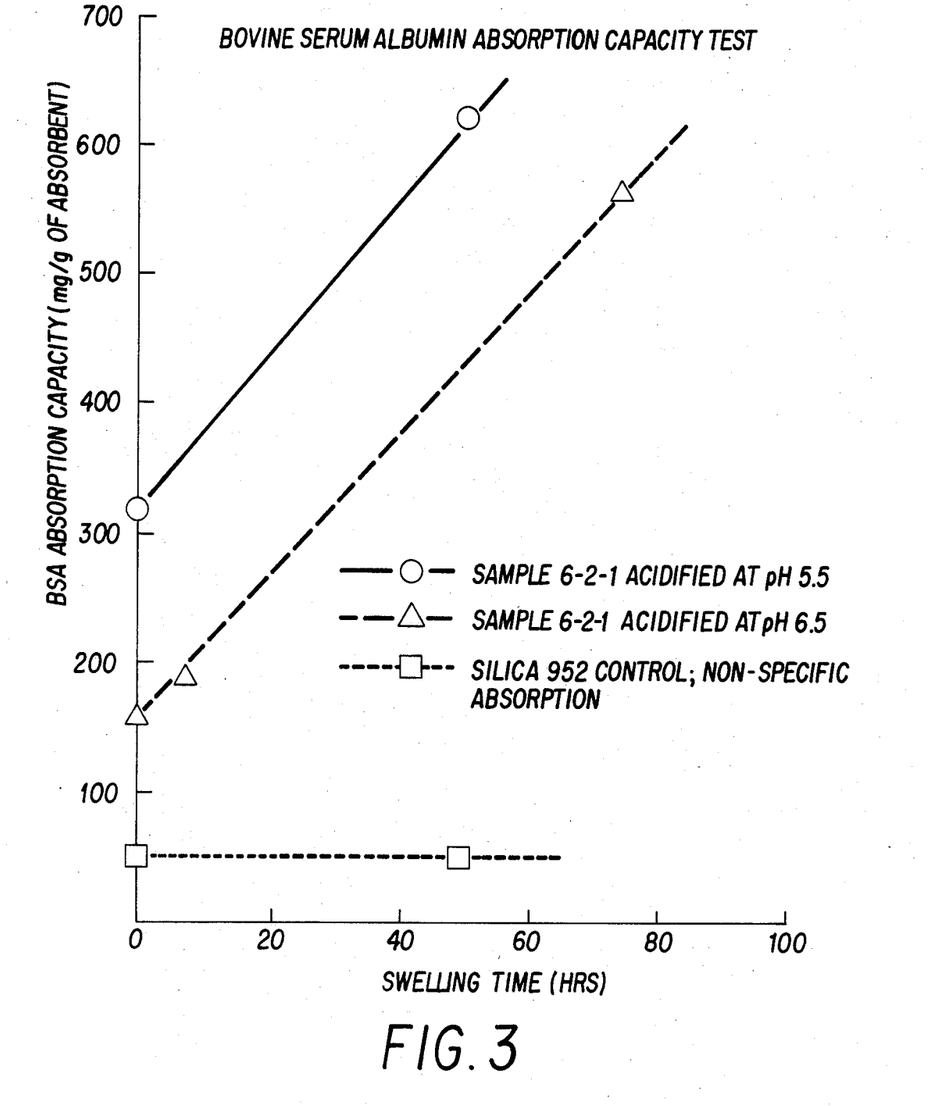
FIG. 3 is a graph relating bovine serum albumin capacity to swelling time.

In order to ascertain the Bovine Serum Albumin (BSA) binding capacity of the cross-linked, quaternized, modified silica of Example 3, 0.5 grams of the particles of Example 3 were mixed with 20 ml of phosphate buffer at pH 6.5 and 20 ml of BSA. This mixture was manually shaken periodically for a ten minute period, centrifuged at 2000 rpm for 10 minutes, and evaluated at various time intervals. Protein loss due to adsorption by the product particles at a wave length of 280 nm on the U.V. spectrophotometer was determined, the result shown in FIG. 3. As demonostrated by FIG. 3, the BSA absorption capacity at pH 5.5 after 50 hours is approximately 600 mg per gram of the proposed absorbent, which is 3 times more in capacity than that of silica prepared with silane coupling agent and 12 times the adsorption capacity of the untreated silica.

EXAMPLE 5

Weight Ratio of Acrylic Polymer to Silica

The weight gain of acrylic copolymer was determined by Thermal Gravametric Analysis (TGA). The modified silica particles of Example 3 demonstrated a weight gain of 140%. Thus more than 1 gram of acrylic copolymer was covalently bonded to 1 gram of silica particles.

EXAMPLE 6

Figure 4:
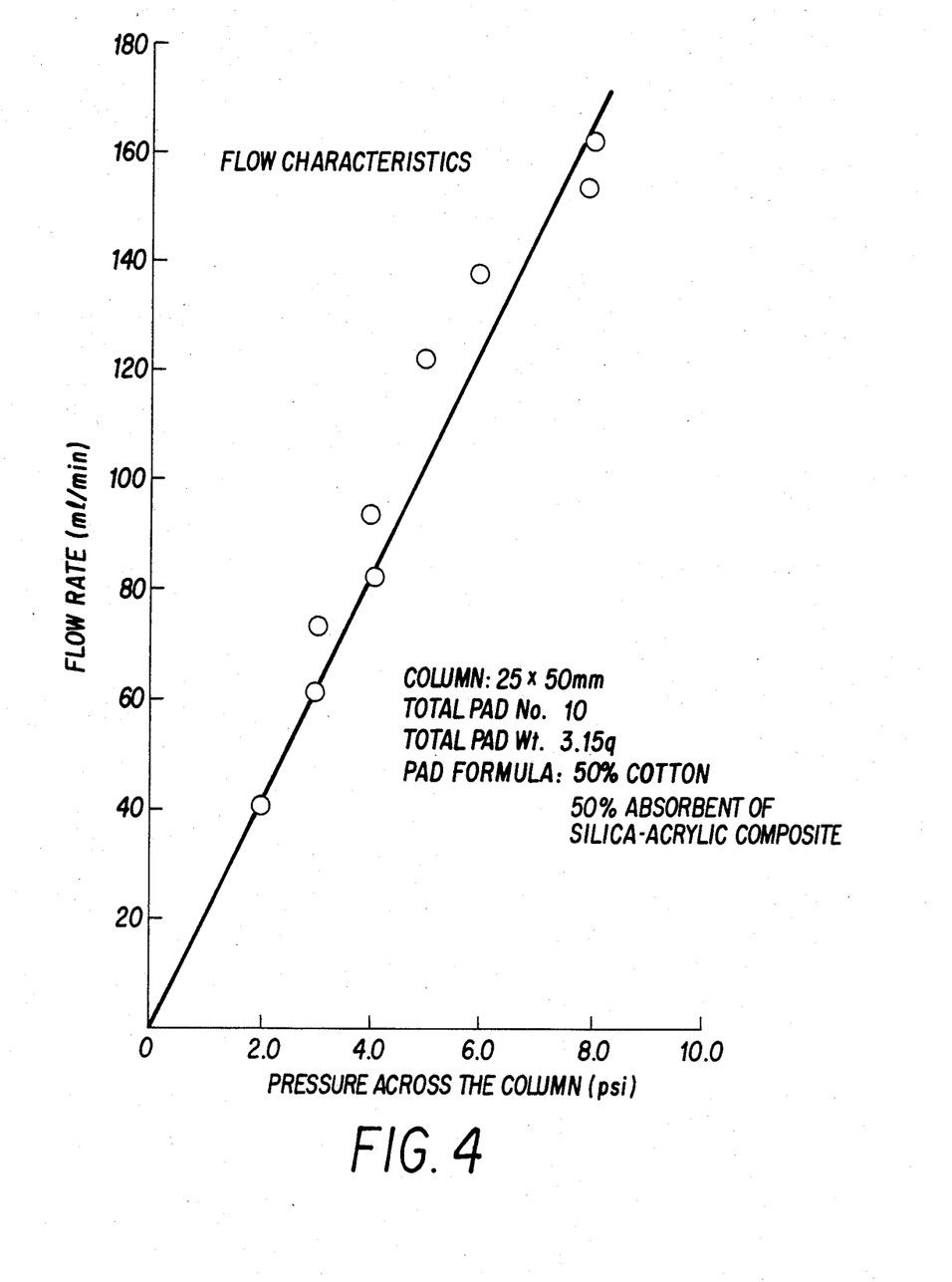
FIG. 4 is a graph relating flow rate to pressure across the column for a column packed with adsorption media of the present invention.

FIG. 4 is a graph showing the relationship between flow rate (ml/min) and pressure across the column (psi). In this experiment, a column having a dimension of 25 mm by 50 mm was prepared using 10 pads. The total pad weight was 3.15 grams, each pad containing 50% cotton and 50% of the silica-acrylic composite of Example 3. As may be seen from FIG. 4, large scale column operation is made possible by the instant modified silica particles. The flow characteristics of this media may be adjusted by the ratio of cotton fiber to absorbent, the ratio of polymer to silica, the molecular weight and degree of crosslinking of the polymer, the particle size of silica, and the mode of pad fabrication, such as addition of dispersion agent for flocculent.

EXAMPLES 7-13

DEAEMA/GMA copolymer was prepared according to Example 1. The resulting copolymer was coupled to varying amounts of silica (Si-952 from Davidson Chemical Company) in the proportions indicated in Table 1 below, using the procedure of Example 2. The acrylic-silica ratio was calculated based on the reagent weights and by TGA. The protein capacity for each of the resulting modified silica materials was evaluated by analyzing the UV adsorption at 280 nm in accordance with the procedure set forth in Example 4. The protein (BSA) binding capacity of each of the modified silica materials is listed in Table 1.

TABLE 1

Relationship Between The Amount Of Acrylic Polymer Coupled On Silica Gel Surface To Protein Adsorption Capacity

| Example No. | Acrylic to Silica Ratio Calculated from Reagents* | Acrylic to Silica Ratio Calculated from TGA | Protein Cap/pH (mg/g) |
|---|---|---|---|
| 7 | 0.0726 | 0.067 | (BSA)3/6.3 |
| 8 | 0.110 | 0.110 | (BSA)56/6.3 |
| 9 | 0.165 | 0.155 | (BSA)67/6.3 |
| 10 | 0.22 | 0.210 | (BSA)177/6.3 |
| 11 | 0.33 | 0.310 | (BSA)412/6.3 |
| 12 | 0.44 | 0.407 | (BSA)576/6.3 |
| 13 | 0.55 | 0.505 | (BSA)1492/6.3 |

*Based on the total reagents added to the reactor

EXAMPLES 14-20

DEAEMA/GMA copolymer was prepared according to Example 1 and covalently coupled to varying amounts of diatomaceous earth (d.e.) using the procedure as set out in Example 2 but substituting d.e. for silica. The diatomaceous earth was DE-4106 having a particle size in the range of 10-15 microns and commercially available from Dicalite, Los Angeles, Calif. Products having a weight ratio of polymer to silica from 0.1-1 were evaluated with regard to BSA binding capacity at pH 6.3, using UV absorption at 280 nm as in Example 4. The polymer-silica weight ratio and protein binding capacity of each of Examples 14-20 are set forth in Table 2 below.

TABLE 2

| Example No. | Weight Ratio Of Polymer to D.E. | pH of Binding | Binding Capacity of BSA (mg/g) |
|---|---|---|---|
| 14 | 80% | 6.3 | 484, 530 |
| 15 | 60% | 6.3 | 666, 622 |
| 16 | 50% | 6.3 | 550, 510 |
| 17 | 40% | 6.3 | 480, 500 |
| 18 | 30% | 6.3 | 320, 350 |
| 19 | 20% | 6.3 | 242, 272 |
| 20 | 10% | 6.3 | 30, 500 |

EXAMPLE 21

For comparative purposes, DEAE-4106, a commercially available product prepared by coating DE-4106 with diethylaminoethyl silane, was evaluated regarding BSA binding capacity, again using the procedure of Example 2. The BSA binding capacity at pH 6.3 was 120.8 mg/g, less than half that of Example 19, the present invention wherein the polymer-d.e. ratio was only 0.2.

EXAMPLES 22-24

Three different silica modified-ion exchange media carrying sulfonyl ($-SO_3^-$) groups were prepared by reacting glycidyl methacrylate with Si-952, the weight ratio of silica to monomer set forth in Table 3 below. The reaction was conducted in the presence of ammonium persulfate and sodium thiosulfate catalyst, at 80° C., with constant agitation, for 30 minutes. Sufficient HCl and $Na_2SO_3$ was then added to the reaction mixture to convert uncoupled epoxy groups to sulfo-propyl groups. The $Ca^{+2}$ capacity for each modified silica was evaluated at a pH range of 7.4-7.8 using the Hach testing kit available from Hach Co., Loveland, Co.; the gamma-globulin binding capacity for each polymer was evaluated with pH 5 buffer solution. The $Ca^{+2}$ and gamma-globulin binding capacity are reported in Table 3 below.

TABLE 3

| Example No. | Wt. Ratio of Polymer to Silica | Ca+2 Cap. (ppm) in Wet Form | Ca+2 Cap. (ppm) in Dried Form | γ-G Cap. (mg/g) |
|---|---|---|---|---|
| 22 | 1.0–0.5 | 163 | — | 730 |
| 23 | 1.0–0.5 | 233 | 250.3 | 319 |
| 24 | 1.5–0.5 | 148 | — | — |

EXAMPLE 25

Where higher pH ranges are contemplated, the more hydrophilic nature of dimethylaminoethyl methacrylate (DMAEMA) and dimethylaminoethyl acrylate (DMAEA), copolymerized with glycidyl methacrylate and glycidyl acrylate, provide high protein binding capacity in the pH 7–9 range.

EXAMPLES 26–36

Exchange Capacity Determinations

Exchange capacity (EC), for the purposes of this application, is defined as the milliequivalents of organic functional group-containing monomer per unit weight of silica substrate and is expressed as milliequivalents per gram (meq/g).

To determine milliequivalents (meq) of organic functional group-containing monomer, a silica support according to the present invention is subjected to thermogravimetric analysis (TGA) whereby the support is fired in a high-temperature furnace to burn off all of the acrylic polymer covalently coupled to the silica substrate. The weight loss of the calcined modified support is the weight of acrylic polymer originally coupled.

The acrylic polymer may or may not be totally organic functional group-containing. That portion of the acrylic polymer that is functional group-containing may be determined from the following equation:

$$W_f = W_m \times \frac{M.W._f}{M.W._c + M.W._f}$$

where $W_f$ equals the weight of functional group-containing monomer; $W_m$ equals the weight of polymer as determined by TGA; $M.W._f$ equals the molecular weight of the functional group-containing monomer; and $M.W._c$ equals the molecular weight of the coupling group-containing monomer.

In the following Examples 26–32, $M.W._f$ is DEAEMA, $M.W._c$ is GMA and the polymer contains DEAEMA and GMA in a ratio of 10:1. Thus, $M.W._f/M.W._c + M.W._f$ equals 10/11. Therefore, $$W_f = W_m \times 10/11.$$

Since meq of the functional monomer is the weight of functional monomer divided by its equivalent weight, $$EC = W_m \times \frac{\frac{M.W._f}{M.W._c + M.W._f}}{E.W._f}$$

where $E.W._f$ equals the milliequivalent weight of the organic functional group-containing monomer.

Various supports according to the present invention were evaluated, the results tabulated in Table 4 below. Various amounts of a DEAEMA-GMA polymer matrix were coupled to a silica substrate, the precise amount determined by TGA. In Examples 26–29 and 31, the silica was Si-56 from Davidson Chemicals; in Example 30, the silica was Si-952 from Davidson Chemicals; and in Example 32, the silica was Si-4106 from Davidson Chemicals.

TABLE 4

| Ex. No. | $W_f$ | EC (calculated) | EC (by titration) |
|---|---|---|---|
| 26 | 0.75 | 2.106 | — |
| 27 | 0.72 | 2.054 | — |
| 28 | 0.95 | 2.396 | — |
| 29 | 0.898 | 2.325 | — |
| 30 | 1.72 | 3.110 | 2.8* |
| 31 | 1.63 | 3.050 | 3.10** |
| 32 | 1.72 | 3.11 | — |

*The sample was swelled for 3 hours.
**The sample was swelled for 2 days.

The invention now being fully described it will be apparent to those with ordinary skill in the art that many changes and modifications can be made thereto without departing from the spirit or scope of the invention as set forth herein.

What is claimed as new and desired to be secured by Letters Patent of the United Staes is:

1. A modified silica material which comprises:
   (1) silica covalently bonded to a synthetic polymer;
   (2) said synthetic polymer comprising a copolymer made from a free-radical polymerization of
       (a) a polymerizable compound containing an epoxy group capable of direct covalent coupling to a hydroxy group of said silica and a vinyl group, capable of free-radical polymerization; and
       (b) a polymerizable compound having the formula wherein R is an alpha, beta-ethylenically unsaturated polymerizable radical, R' and R" are the same or different $C_1$–$C_6$ alkyl or alkanoyl groups, and R''' is a direct bond or a $C_2$–$C_3$ alkyl group, wherein R' and R", taken together with the N atom may form a heterocyclic ring.

2. The material of claim 1 wherein said synthetic polymer also contains up 20% by weight of a neutral radical polymerizable compound, different than those represented by said polymerizable compound (b).

3. The material of claim 1 wherein said polymerizable compound (b) has been reacted with an affinity ligand.

4. The material of claim 1 wherein said polymerizable compound (b) has been reacted with a biologically active molecule.

5. The material of claim 1 wherein said silica is selected from talc, kaolinite, pyrophyllite, serpentine, smectite, montmorillonite, mica, vermiculite, silica gel, silica powder, porous glass, kieselguhr or diatomaceous earth.

6. The material of claim 1 wherein said compound (b) is a mixture of two or more compounds carrying different ionizable chemical groups.

7. The material of claim 1 wherein the amount of said compound (a) in said synthetic polymer is sufficient to cause substantial covalent coupling of the polymer to said silica, yet insufficient to cause substantial loss of porosity of the modified silica.

8. The material of claim 2 wherein said polymer has 1 to 500 units.

9. The material of claim 8 wherein said polymer has 20 to 100 units.

10. The material of claim 1 wherein said synthetic polymer is crosslinked.

11. The material of claim 10 wherein said crosslinking is provided by making said synthetic polymer in the presence of a compound having at least two radical polymerizable bonds.

12. The material of claim 10 wherein said synthetic polymer carries nitrogen atom-containing groups and said crosslinking is provided by means of bifunctional reagents capable of reacting with at least two of said nitrogen atoms per reagent.

13. The material of claim 12 wherein said reagent is

Hal—CH$_2$—phenyl—CH$_2$—Hal, Hal—(CH$_2$)—$_n$Hal, or where Hal is a halogen atom, or and n is 2 to 12.

14. The material of claim 3 wherein said affinity ligand is an enzyme, a nucleic acid, an antigen, an antibody, a saccharide, a lectin, an enzyme cofactor, an enzyme inhibitor or a binding protein.

15. The material of claim 4 wherein said biologically active molecule is an enzyme.

16. A self-supporting silica matrix which comprises the material of any of claims 1, 3 or 4.

17. The matrix of claim 16 which also comprises highly refined cellulose pulp with a Canadian Standard Freeness of between +100 to −600 ml.

18. The matrix of claim 16 which also comprises a particulate different from the modified silica.

19. The matrix of claim 18 wherein said particulate is siliceous.

20. The matrix of claim 8 wherein said particulate has been chemically modified to carry ionizable chemical groups.

21. The matrix of claim 19 wherein said siliceous particulate has been modified with silane groups.

22. The matrix of claim 18 wherein said particulate has an average particle diameter between 1 millimicron and 100 microns.

23. The matrix of claim 16 which is in the form of a sheet.

24. In a method of ion exchange chromatography, the improvement comprising utilizing as the ion exchanger the material of claim 5.

25. In a method of affinity chromatography, the improvement comprising utilizing as the insoluble ligand support the material of claim 3.

26. In a method of carrying out chemical reactions using an insolubilized biologically active molecule, the improvement comprising wherein the insoluble support for said molecule is the material of claim 4.

27. The methods of any of claims 24, 25 or 26 wherein said material is in the form of a self-supporting silica matrix.

28. The method of claim 27 wherein said matrix also comprises a particulate different from the modified silica.

29. The method of claim 28 wherein said particulate different from silica carries ionizable chemical groups.

30. The method of claim 27, wherein said sheet is in the form of a sheet.

31. The method of claim 30, wherein said sheet is in the form of a disc.

32. A process for preparing the modified silica material of claim 1 which comprises:
(1) polymerizing said compound (a) which has a group capable of reacting with the hydroxy group of said silica, with said compound (b) in the presence of said silica, under temperature and pH conditions insufficient to cause the covalent binding of said compound (a) to said silica thereby to form a synthetic polymer of (a) and (b);
(2) reacting said silica with the chemical group of compound (a) in said synthetic polymer under temperature and pH conditions sufficient to cause covalent bonding of said polymer to said silica.

33. The process of claim 32 wherein said step (2) is carried out at a temperature which is higher than that used for step (1).

34. The process of claim 32 wherein said step (1) polymerization is initiated by redox initiation or photochemical initiation.

35. The process of claim 32, wherein said compound (a) carries nitrogen atom-containing groups and which further comprises the step of
(3) crosslinking said synthetic polymer which modifies said silica with a bifunctional crosslinking agent capable of reacting with at least two of said nitrogen atoms per reagent.

36. A chromatography column for effecting chromatographic separation of at least two components of a sample flowing therethrough comprising:
at least one solid stationary phase having a longitudinal axis, said phase having chromatographic functionality and being effective for chromatographic separation;
a means for radially distributing the sample through the stationary phase;
wherein the stationary phase comprises:
(a) a swellable fibrous matrix in sheet form having chromatographic functionality and being effective for chromatographic separation, spirally wound around the longitudinal axis of the solid phase to form a plurality of layers around the axis;
(b) a spacer means between each layer for permitting controlled swelling thereof and enhancing the distribution of sample flowing radially through the stationary phase,
and further wherein the swellable fibrous matrix in sheet form comprises a modified silica material, said modified silica material comprising the material of claim 1.

* * * * *